US010574724B2

(12) United States Patent
Demulder et al.

(10) Patent No.: US 10,574,724 B2
(45) Date of Patent: Feb. 25, 2020

(54) AUTOMATIC DISCOVERY OF MANAGEMENT NODES AND GENERATION OF CLI USING HA MODULE (71) Applicant: Western Digital Technologies, Inc., Irvine, CA (US)

(72) Inventors: Timothy Demulder, Zwijnaarde (BE); Wim De Waegeneer, Ghent (BE)

(73) Assignee: Western Digital Technologies, Inc., San Jose, CA (US)

( * ) Notice: Subject to any disclaimer, the term of this patent is extended or adjusted under 35 U.S.C. 154(b) by 326 days.

(21) Appl. No.: 15/400,702

(22) Filed: Jan. 6, 2017

(65) Prior Publication Data

US 2018/0198839 A1    Jul. 12, 2018

(51) Int. Cl.
*H04L 29/08* (2006.01)
*H04L 12/24* (2006.01)

(52) U.S. Cl.
CPC .............. *H04L 67/02* (2013.01); *H04L 41/32* (2013.01)

(58) Field of Classification Search
CPC ..... H04L 67/02; H04L 67/1002; H04L 67/16; H04L 67/2823; H04L 41/32; H04L 47/70; H04L 63/029; H04L 65/1069; H04L 67/10; H04L 41/0253; H04L 45/02; H04L 45/22; H04L 63/20; H04L 67/1014;

(Continued)

(56) References Cited

U.S. PATENT DOCUMENTS 6,615,231 B1 *  9/2003  Deen .................... G06F 9/5055
                                                    709/200
7,239,629 B1 *  7/2007  Olshansky ........... H04Q 3/0045
                                                    370/353

(Continued)

OTHER PUBLICATIONS

"Marvin Framework an Open Source, extensible and platform-independent Java image processing framework", www.Softpedia.com, published Dec. 30, 2016, 2 pages (Year: 2016).*

*Primary Examiner* — Jason D Recek
*Assistant Examiner* — Ranjan Pant
(74) *Attorney, Agent, or Firm* — Patent Law Works LLP (57) ABSTRACT Systems and methods for communicating with the Representational State Transfer (REST) Application Programming Interface (API), by providing a set of libraries for the Hypertext Transfer Protocol (HTTP) verbs used (that function without providing the Uniform Resource Locator (URL) to the management server in which the REST API resides) are disclosed. A caller requires no knowledge of where the management server is located in a high-availability (HA) situation, in which the management server can easily migrate and the Internet Protocol (IP)/URL can change frequently. A high-availability module automatically searches a command-line interface (CLI) and associated libraries, based on REST API OPTION functions. With each of the resources specified by the OPTIONS on the root (REST API root), the CLI requests the OPTIONS to dynamically build the entire CLI object to communicate with the API. Because of Marvin's HA HTTP verbs, the CLI object is HA enabled, making the HA system's architecture transparent to the calling library or user.

23 Claims, 6 Drawing Sheets (58) Field of Classification Search
CPC .......... G06F 17/30893; G06F 11/1464; G06F 11/3438; G06F 9/44505
See application file for complete search history.

(56) References Cited

U.S. PATENT DOCUMENTS

| | | | | |
|---|---|---|---|---|
| 7,444,620 | B2 * | 10/2008 | Marvin ..................... | G06F 8/36 |
| | | | | 717/116 |
| 8,347,265 | B1 * | 1/2013 | Sirianni .................. | G06F 9/451 |
| | | | | 717/108 |
| 8,504,543 | B1 | 8/2013 | Andreessen et al. | |
| 8,782,769 | B2 | 7/2014 | Gupta et al. | |
| 8,893,077 | B1 | 11/2014 | Aiuto et al. | |
| 9,734,349 | B1 * | 8/2017 | Prafullchandra ... | G06F 21/6218 |
| 9,785,412 | B1 * | 10/2017 | Huynh Van ............... | G06F 8/24 |
| 10,185,546 | B2 * | 1/2019 | Kaulgud ................... | G06F 8/20 |
| 2003/0163448 | A1 | 8/2003 | Kilemba et al. | |
| 2009/0063665 | A1 * | 3/2009 | Bagepalli ............... | H04L 63/166 |
| | | | | 709/222 |
| 2010/0114336 | A1 * | 5/2010 | Konieczny .......... | G05B 19/058 |
| | | | | 700/17 |
| 2011/0131318 | A1 * | 6/2011 | Maes .................. | G06F 11/1482 |
| | | | | 709/224 |
| 2012/0136921 | A1 * | 5/2012 | Samdadiya ......... | G06F 11/3006 |
| | | | | 709/203 |
| 2013/0046894 | A1 * | 2/2013 | Said ........................ | G06F 9/547 |
| | | | | 709/226 |
| 2013/0080480 | A1 * | 3/2013 | Mao .................... | H04L 41/5009 |
| | | | | 707/803 |
| 2014/0075242 | A1 * | 3/2014 | Dolinina ............. | G06F 11/3672 |
| | | | | 714/27 |
| 2014/0244721 | A1 * | 8/2014 | Taine ..................... | H04L 65/40 |
| | | | | 709/203 |
| 2014/0337467 | A1 * | 11/2014 | Pech ..................... | H04L 67/02 |
| | | | | 709/217 |
| 2015/0007199 | A1 * | 1/2015 | Valeva .................... | G06F 9/546 |
| | | | | 719/313 |
| 2015/0244788 | A1 * | 8/2015 | Fausak .................. | G06F 16/972 |
| | | | | 709/203 |
| 2016/0124742 | A1 * | 5/2016 | Rangasamy ............ | H04L 47/70 |
| 2016/0134599 | A1 * | 5/2016 | Ross ....................... | H04L 63/08 |
| | | | | 713/168 |
| 2016/0147578 | A1 * | 5/2016 | Biesack .................. | G06F 9/541 |
| | | | | 719/328 |
| 2016/0294953 | A1 * | 10/2016 | Prabhakar ............ | H04L 67/142 |
| 2016/0350095 | A1 * | 12/2016 | Ramachandran ......... | G06F 8/65 |
| 2017/0093754 | A1 * | 3/2017 | Zhang ................. | H04L 12/4641 |
| 2017/0279668 | A1 * | 9/2017 | Shevenell .............. | H04L 67/10 |
| 2017/0374154 | A1 * | 12/2017 | Hamill .................. | H04L 67/125 |
| 2018/0157513 | A1 * | 6/2018 | Deodhar ................. | G06F 9/451 |

* cited by examiner

AUTOMATIC DISCOVERY OF MANAGEMENT NODES AND GENERATION OF CLI USING HA MODULE

BACKGROUND

The present disclosure relates to systems and methods for automatic discovery of management nodes and automatic generation of commands using High Availability ("HA") modules and Hypertext Transfer Protocol ("HTTP") options, while interacting with distributed resources over a network. More particularly, the present disclosure relates to systems and methods for communicating with a REpresentational State Transfer ("REST") Application Programming Interface ("API"), by providing a set of libraries for the HTTP verbs used, adapted to function without supplying the Uniform Resource Locator ("URL") to the management server in which the REST API resides. By these systems and methods, a user requires no knowledge of where the management server is located in HA environments. This is a distinct advantage, because in HA environments, the management server can easily migrate, and the Internet Protocol/Uniform Resource Locator ("IP/URL") can change frequently. The present disclosure also relates to automatically searching a Command-Line Interface ("CLI") and associated libraries, based on REST API OPTION functions (used to retrieve available HTTP verbs for a given resource) by a HA module. These systems and methods support each of the resources specified by the OPTIONS on the root (REST API root), whereby the CLI requests the OPTIONS to dynamically build the entire CLI object to communicate with the API. These systems and methods are configured to receive all HTTP verb functions including Marvin's HA HTTP verbs, by which the CLI object is completely HA-enabled, allowing the underlying HA system to be transparent to the calling library or user.

Typically, in existing systems and methods, writing libraries to communicate with a given REST API requires writing of specific code to target specific URLs. In addition, typically, regular HTTP verb libraries do not provide HA functionality, particularly in the absence of the complete URL.

It would be desirable to make this process generic and dynamically-built by the logical object, while the caller communicates with the API.

SUMMARY

Systems and methods for allowing a caller to invoke a REST API at an application server are disclosed, by providing a set of libraries for the HTTP verbs (or methods) used, which are adapted to function without providing the URL to the management server in which the REST API resides. A caller does not require knowledge of the location of the management server in HA situations, in which the management server can easily migrate, and the IP/URL frequently changes.

In accordance with one innovative aspect, the systems and methods provide automatic searching of a CLI and associated libraries, based on REST API OPTION functions (used to retrieve available HTTP verbs for a given resource) using a HA module. These systems and methods support each of the resources specified by the OPTIONS on the root (REST API root), whereby the CLI requests the OPTIONS to dynamically build the entire CLI object to communicate with the API. In some instances, all HTTP verb functions used in this method may be Marvin's HA HTTP verbs, as a result of which the CLI object is completely HA-enabled, rendering the underlying HA system transparent to the calling library or user.

In general, one innovative aspect of the subject matter described in this disclosure may be embodied in methods that include: 1) providing one or more REST locations on an application programming interface (API) for a particular application, with an OPTIONS verb option configured to respond to a call, by a command-line interface (CLI); 2) upon receiving the call for the OPTIONS verb option at a REST API root, by the command-line interface, executing the OPTIONS verb option to build a model with one or more possible actions and resources; and 3) responding to the call, by returning the one or more possible actions and resources for use, by converting the possible one or more actions and resources to HA HTTP verb method on a command-line interface (CLI) parent class and configuring the resources as subclasses of the parent class, the command-line interface (CLI) serving to transport human-readable messages and code configured to call an API function and receive return instructions.

Other implementations of one or more of these aspects include corresponding systems, apparatus, and computer programs, configured to perform the actions of the methods, encoded on computer storage devices.

According to another innovative aspect of the subject matter described in this disclosure, a system may be configured with a processor and memory with instructions that cause the processor to: 1) provide one or more REST locations on an application programming interface (API) for a particular application, with an OPTIONS verb option configured to respond to a call, by a command-line interface (CLI); 2) upon receiving the call for the OPTIONS verb option at a REST API root, by the command-line interface, execute the OPTIONS verb option to build a model with one or more possible actions and resources; and 3) respond to the call, by returning the one or more possible actions and resources for use, by converting the possible one or more actions and resources to HA HTTP verb method on a command-line interface (CLI) parent class and configuring the resources as subclasses of the parent class, the command-line interface (CLI) serving to transport human-readable messages and code configured to call an API function and receive return instructions.

These and other implementations may each optionally include one or more of the following features. For example, one of the features may include that for each of the resources specified by the OPTIONS, the command-line interface (CLI) is configured to request the OPTIONS to dynamically build a command-line object to communicate with the API. Yet another feature may include a plurality of attributes set to define each resource. Yet another feature may include one or more sub resources configured to act as resources of a resource. Yet another feature may include that the command-line interface enabled for a high-availability environment and a high-availability system is transparent to a calling library or user. Yet another feature may include a mechanism by which resource-generic actions are set to be callable on the resources. Yet another feature may include that at least one of the resource guid and a primary key are used for an identifier. Yet another feature may include that the library is from a set of libraries provided for the HTTP verbs used, wherein the HTTP verbs function without providing a URL to the management server in which the REST API resides.

This technology is advantageous in many ways. A significant advantage is because regular or conventional HTTP verb libraries are not HA-enabled. Providing this functionality as a standard HTTP verb library would be extremely beneficial.

It should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure relates to systems and methods for communicating with the REpresentational State Transfer ("REST") Application Programming Interface ("API"), by providing a set of libraries for the Hypertext Transfer Protocol ("HTTP") verbs used, which function without supplying the Uniform Resource Locator ("URL") to the management server in which the REST API resides. By this method, a user does not require knowledge of the location of the management server, in High Availability ("HA") situations or environments, in which the management server can migrate easily, and the Internet Protocol/Uniform Resource Locator ("IP/URL") changes frequently. A Command-Line Interface ("CLI") and associated libraries are based on REST API OPTION functions (used to retrieve available HTTP verbs for a given resource) by a HA module. These systems and methods support each of the resources specified by the OPTIONS on the root (REST API root), whereby the CLI requests the OPTIONS to dynamically build the entire CLI object to communicate with the API. These systems and methods are configured to use all HTTP verb functions including Marvin's HA HTTP verbs, as a result of which, the CLI object is completely HA enabled, allowing the underlying HA system to be transparent to the calling library or user.

For purposes of this disclosure and to understand the context of the present invention, certain terminology and example environments that may be used and may be known to those skilled in the art are described here. For example, it should be recognized that embedded systems are complex systems that combine operating system functions and applications functions in the same program and therefore, require management by a variety of user interfaces, the most common of which is a CLI. CLI involves configuration and display commands entered in text mode that are promptly executed. Typically, a set of function calls is initiated by the embedded system and utilized in implementing the CLI. This leads to a dependency of the user interface application on the underlying implementation of the embedded system, which requires the embedded system to provide a consistent interface to the CLI.

It should be recognized that for the purpose of this disclosure, a resource is something an application defines. It is similar to objects. HTTP verbs or methods are invoked on a resource. Typically, distributed application designers create a URL for their resources (e.g., content). A method is an action or operation that can be performed on a particular resource.

It should also be recognized that a CLI is a means of interacting with a computer program where the user (or client) issues commands to the program in the form of successive lines of text (command lines). The interface is typically implemented by a command-line shell, which is a program that accepts commands as text input and converts commands to appropriate operating system functions. Command-line interfaces provide a concise and effective way to control a program or operating system.

REST stands for REpresentational State Transfer and refers to an architectural style and approach for designing networked applications. REST relies on a stateless, client-server, cacheable communications protocol, typically used for the internet. The REST architecture is decoupled, by which flexible and quick communications between a producer and consumer are easily executed. REST is a popular building style for cloud-based APIs. When web services use the REST architecture, they are called either RESTful APIs or REST APIs. Because REST APIs use HTTP protocol, they can be used by practically any programming language and are easy to test as the client and server are separate. The World Wide Web (www) is an example of a distributed system that uses REST protocol architecture to provide a hypermedia driven interface for websites.

For the purpose of this invention, it should also be recognized that the REST architecture treats every type of content as a resource. These resources may be text files, html pages, images, videos, or dynamic business data. The REST Server provides access to resources, and a REST client may access and modify the resources. In this environment, every resource is identified by Uniform Resource Identifiers (URIs)/global Identifiers (IDs). REST uses various representations to represent a resource, with Extensible Markup Language ("XML") and JavaScript Object Notation ("JSON") being the most popular. JSON is an alternative to XML and is a readable format for structuring data and transmitting data between a server and a web application.

For example, in some scenarios, REST may require reading a designated web page that contains an XML file. The XML file describes and includes the desired content. Once dynamically defined, consumers may access the interface. A resource in REST is similar to an Object in Object Oriented Programming or similar to an Entity in a Database. Once a resource is identified, then its representation is determined using a standard format, so that a server in a distributed environment can send the resource in a format that is understood by the client. REST typically operates over HTTP and is widely used in mobile applications, social networking, web sites, mashup tools, and automated business processes.

The REST style of communication enhances interactions among clients and services by using a uniform interface that includes a few basic primitive commands (e.g., GET, POST, PUT, and DELETE) that act upon targets. These commands offer a limited number of operations (or verbs or methods). HTTP verbs comprise a major portion of the "uniform interface" constraint and provide the action counterpart to the noun-based resource. The primary or most-commonly used HTTP verbs (or methods) are POST, GET, PUT, PATCH, and DELETE, which correspond to create, read, update, and delete operations. There are other verbs that are less frequently used, the more popular of which are the OPTIONS and HEAD. Flexibility is provided by assigning resources (nouns) their own unique Universal Resource Identifiers ("URIs"). Because each verb has a specific meaning, REST avoids ambiguity. There are some drawbacks because there is no direct support for generating a client from the server-side-generated metadata.

Because REST APIs use HTTP, they are operable by any programming language and are easy to test. For example, the World Wide Web (WWW) is an example of a distributed system that uses REST protocol architecture to provide a hypermedia driven interface for websites. HTTP methods are used for RESTful services. For example, the POST verb is most often utilized to "create" new resources. In particular, it may be used to create subordinate resources, as in, subordinate to some other (e.g., parent) resource. For example, to create a new resource, POST to the parent and the service associates the new resource with the parent, assigning an ID (new resource URI etc.). In the event the creation of a resource is successful, a return HTTP status may indicate a location header with a link to the newly-created resource. There are other verbs or methods such as OPTIONS. The OPTIONS method represents a request for information about the communication options available on the request/response chain identified by the Request-URL. This method allows the client to determine the options and/or requirements associated with a resource, or the capabilities of a server, without implying a resource action or initiating a resource-retrieval.

A REST API has many features, including client-server applications, where the client handles the front end and the server handles the backend and both are configured to be replaced independently of one another. Yet another feature of REST is that it is stateless. No client data is stored on the server between requests, and session state is stored on the client side. Yet another feature is that it is cacheable. Clients can cache a response, just like browsers caching static elements of a web page to improve performance. Any type of distributed hypermedia system can have desirable properties, such as performance, scalability, simplicity, modifiability, visibility, portability, and reliability.

Application Programming Interfaces (APIs) expose some of a system's internal functions that make it possible for applications to share data and take actions on one another's behalf without requiring software developers to share all their software code. APIs limit access to external programs to a specific set of features.

The API Explorer is a CLI that users may typically use to explore the vRealize Automation REST API services and test methods. The vRealize automation platform created for cloud management features a REST API to programmatically interface with a cloud management portal. The vRealize REST API provides consumer, administrator, and provider-level access to the service catalog with the same services that support the vRealize Automation console user interface. Users can perform vRealize Automation functions programmatically by using REST API service calls. The API Explorer is one of several CLIs that are configured for using the vRealize Automation REST API services. While the command-line syntax varies, the API Explorer uses the same input and output parameters as described in REST API use cases.

The command-line syntax provided in the supplied use cases is for curl (a tool for working with URLs). Users may use the supplied curl command-line syntax to create equivalent API Explorer command-line syntax. The API Explorer is one of several command-line interfaces that are available for using the vRealize Automation REST API services.

HA refers to the availability of resources in a computer system, in the event of component failures in the system. This may be accomplished in several ways, ranging from solutions that use custom and redundant hardware to ensure availability, to software solutions using off-the-shelf hardware components.

Frame systems to store data were first introduced by Marvin Minsky, and a Marvin framework refers to a particular type of frame structure to store data. It should be understood that a frame is a data structure for representing a stereotyped situation. Each frame has several kinds of information attached to it. A frame refers to a network of nodes and relations. In some examples, the "top levels" of a frame may be fixed, and the lower levels have many terminals—"slots" that may be filled by specific instances of data. Each terminal can specify conditions that its assignments must meet, which are typically smaller "sub-frames." Simple conditions are specified by markers that might require a terminal assignment to be a person, an object of sufficient value, or a pointer to a sub-frame of a certain type. More complex conditions can specify relations among things assigned to several terminals.

In the context of the present systems and methods, the Marvin framework architecture is configured to be aware of the locations where the management server may be located. Hence, the HTTP verb libraries supplied with Marvin's HA component enable a caller to exclude the IP/URL and attempt to find the management server itself. The management server can render itself HA to a number of machines and therefore, to the REST API as well. Therefore, this mechanism allows a caller to be not concerned with the HA concept and to eliminate the IP/URL portion of the REST URL. The HA library, including the HTTP verb libraries, may determine which server it used last and attempt to access it first, to make the provisioning and processing operations quicker. Only in the event that the HA library determines that the server it attempted to access was in fact not the last one, does it proceed to try other possible locations. Also, the transport layer is automatically detected, eliminating the need for a caller to provide an address. In operation, calling the Marvin, HA HTTP POST function may work by the command below: ha.post ('api/somefunction') instead of iterating the regular ha.post over all possible IPs/URLs—even this may not be efficient due to the amount of caching a HA library typically conducts.

Figure 1:
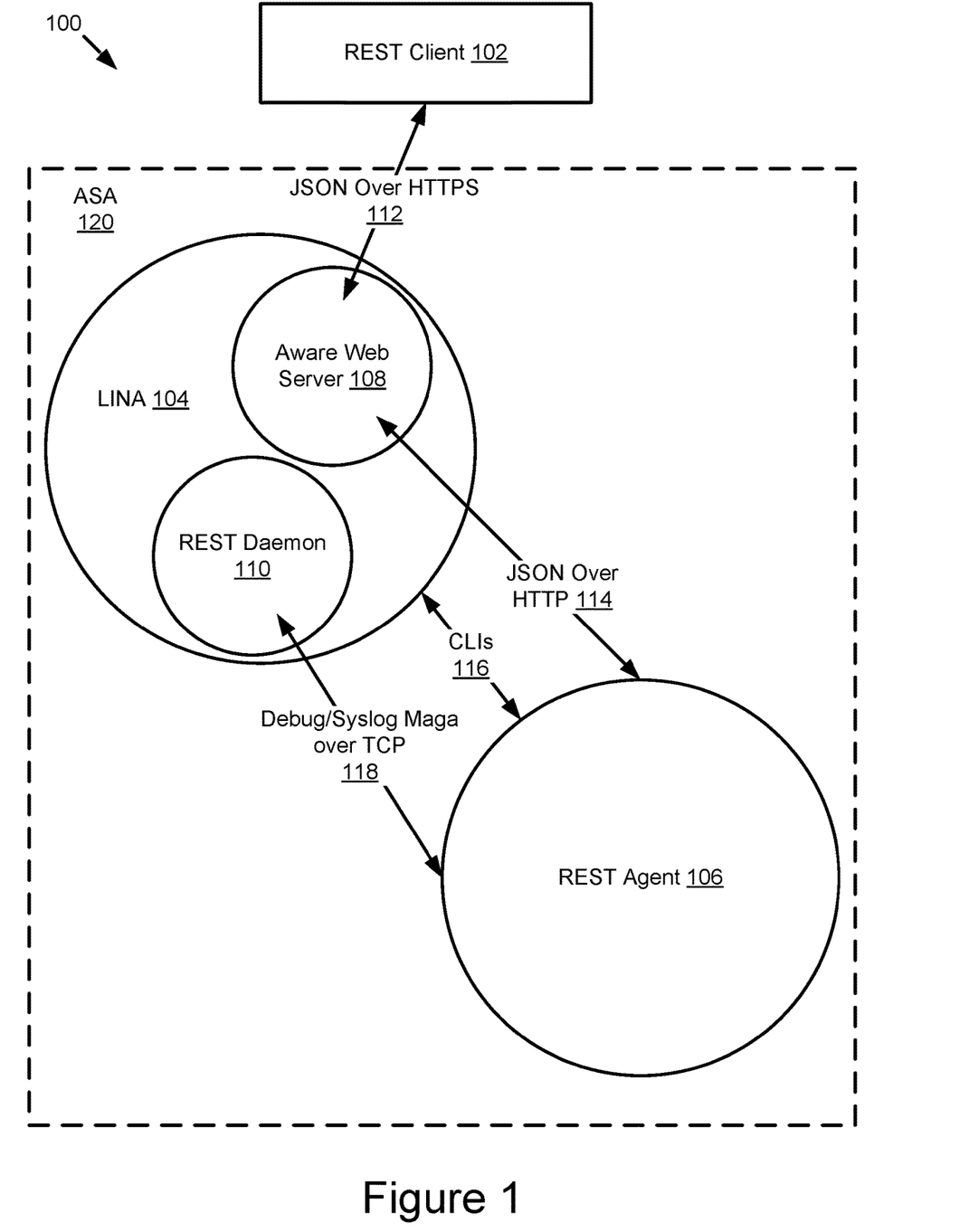
FIG. 1 is a high-level block diagram illustrating an example REST architecture and environment in which the features in accordance with the present invention may be invoked or implemented.

FIG. 1 illustrates a high-level architecture for an example environment 100 (e.g., Adaptive Security Appliance (ASA) (firewall) REST API), in which some of the features of the present invention may operate. In one example, the ASA REST API provides programmatic access to managing individual ASAs through a Representational State Transfer (REST) API. The API allows external clients to perform create, read, update, and delete functions on ASA resources as it is based on HTTP Secure (HTTPS) protocol and REST methodology. There are many methods for managing ASA firewalls, illustrated by reference numeral 120. Most of them involve some version of a command-line interface (CLI) scripting. Recent firewall releases introduced a Representational State Transfer (REST) API that uses HTTPS as its transport, as illustrated by line 112. REST provides an easy way to send and receive data to and from a device (e.g., REST client 102). This data may take many forms, including but not limited to, configuration changes, monitoring or other queries, and it uses JSON (JavaScript Object Notation) as the interface. This API supports five request methods. GET retrieves data from an object. PUT adds data to an existing object. POST creates the object with specified parameters. DELETE deletes the object and any conditions. PATCH applies partial modifications to the object. An aware web server is illustrated at 108, which is in communication with a REST Agent 106. Data is transmitted by HTTP (e.g., JSON in this instance) over line 114. CLIs are communicated between the REST Agent 106 and network administrator software (e.g., LINA, a piece of Linux network administrator software that enables users to run applications compiled for Linux on other operating systems) 104 by line 116. The REST Agent 106 is stateless, therefore, does not generate any distinct unique identifier. The REST Agent 106 is a process based on Adaptive Security Device Manager (ASDM) code and, by default, REST Agent process is not started in ASA. The Adaptive Security Device Manager provides the capability for security management and monitoring through a web-based management interface. A new CLI command when invoked by the user starts the REST AGENT process in the ASA. Data (Debug/Syslog Messages over Transmission Control Protocol (TCP)) is communicated between REST Daemon 110 and REST AGENT 106.

Figure 2:
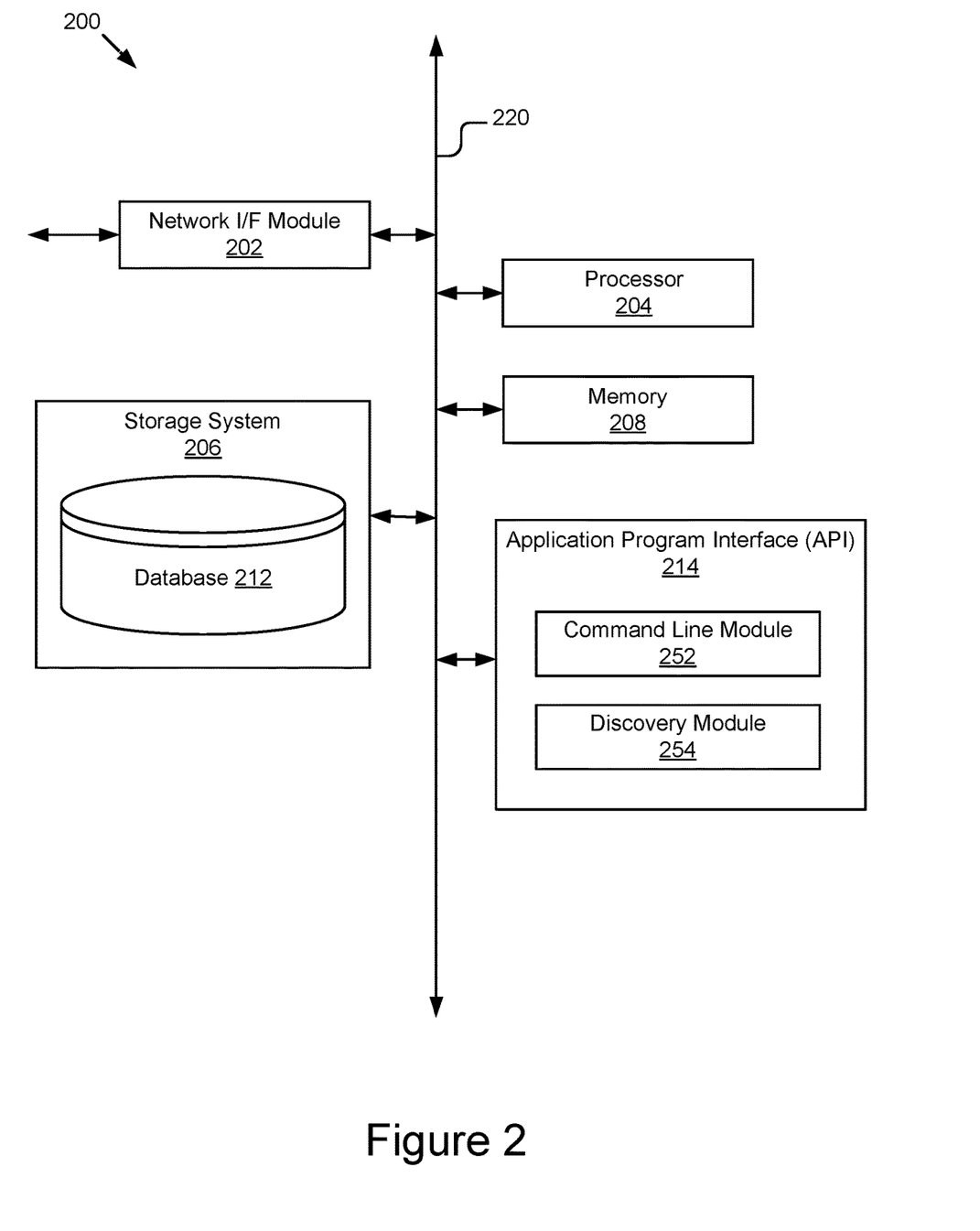
FIG. 2 is a block diagram of an example Application Programming Interface ("API") including an example discovery module in accordance with the present invention adapted for automatic discovery of management nodes and an example command-line module configured to create automatic commands using a HA module and http options.

Referring now to FIG. 2, a system 200 includes a network interface (I/F) module 202, a processor 204, a storage system 206, memory 208, and an application program interface (API) 214 connected by a bus 220. In some instances, the API Explorer is a command-line interface that may be used to explore the vRealize Automation REST API services test methods. The API Explorer is one of several command-line interfaces that are available for using the vRealize Automation REST API services. While command-line syntax varies, the API Explorer uses the same input and output parameters as those for REST API use cases.

The network interface (I/F) module 202 is configured to connect system 200 to a network and/or other system. For example, network interface module 202 may enable communication through one or more of the Internet, cable networks, and other wired networks. The network interface module 202 links the processor 204 to a network that may, in turn, be coupled to other processing systems (e.g., a client or remote device). The network interface module 202 also provides other conventional connections to the network for distribution and/or retrieval of files and/or media objects using standard network protocols such as TCP/IP, HTTP, HTTPS and Simple Mail Transfer Protocol (SMTP) as will be understood. In some implementations, the network interface module 202 includes a transceiver for sending and receiving signals using Wi-Fi, Bluetooth®, or cellular communications for wireless communication.

The network interface module 202 may allow client and/or server devices to store data to and retrieve data from the storage system 206, for example, across the network. For example, the network interface module 202 may allow one or more components of the system 200 to act as network accessed storage or as an array of storage devices.

The processor 204 may include an arithmetic logic unit, a microprocessor, a general-purpose controller or some other processor array configured to perform computations and provide electronic display signals to a display device in accordance with the present invention. In some implementations, the processor 204 is a hardware processor having one or more processing cores. The processor 204 is coupled to the bus 220 for communication with the other components of system 200. Processor 204 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 2, multiple processors and/or processing cores may be included. It should be understood that other processor configurations are possible.

The memory 208 stores instructions and/or data that may be executed by the processor 204. The memory 208 is coupled to the bus 220 for communication with the other components of the system 200. The instructions and/or data stored in the memory 208 may include code for performing any and/or all of the techniques described herein. The memory 208 may be, for example, non-transitory memory such as a dynamic random access memory (DRAM) device, a static random access memory (SRAM) device, flash memory or some other memory device. In some implementations, the memory 208 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or some other non-volatile storage device. In some implementations, the memory 208 may store executable code to perform the functionalities of the Application Program Interface (API) 214.

The storage system 206 is a data storage system that may store information on any type of attached array of writable storage media, such as magnetic disk or tape, optical disk (e.g., CD-ROM or DVD), flash memory, solid-state drive (SSD), electronic random access memory (RAM), microelectro mechanical and/or any other similar media adapted to store information, including data and parity information. However, as illustratively described herein, the information is stored on disks of hard disk drives (HDD). The storage device(s) of the storage system 206 may be included in one or more enclosures housed in the same location or physically distributed to disparate locations across a storage area network. The storage system 206 includes a database 212 configured and adapted in accordance with a Marvin framework (an implementation in which the features of the present invention can operate).

Figure 3:
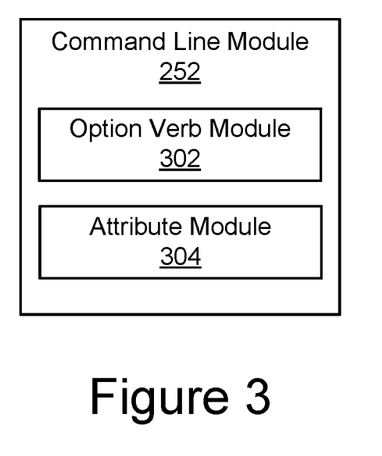
FIG. 3 is a block diagram of an example command-line module in accordance with the present invention.

The Application Program Interface (API) 214 includes a command-line module 252 and a discovery module 254. Referring now to FIG. 3, the command-line module 252 comprises an option-verb module 302 and an attribute module 304. The command-line module 252 is adapted to automatically search a CLI (Command-Line Interface) and the libraries, based on REST API OPTION functions (used to retrieve available HTTP verbs for a given resource) by a HA module. This method supports each of the resources specified by the OPTIONS on the root (REST API root), whereby, the CLI requests the OPTIONS to dynamically build the entire CLI object to communicate with the API. As all HTTP verb functions used in the method are Marvin's HA HTTP verbs, the CLI object is completely HA enabled as well, making the HA system underneath transparent for the calling library or user.

Figure 4:
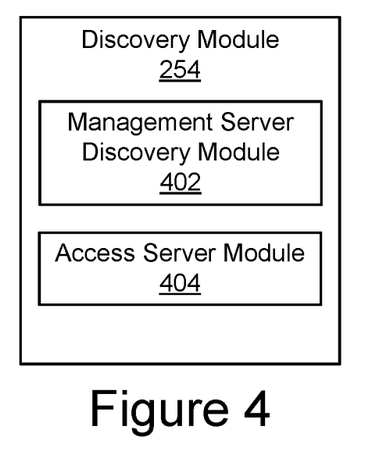
FIG. 4 is a block diagram of an example discovery module in accordance with the present invention.

The discovery module 254 comprises a management server discovery module 402 and an access server module 404, both of which are adapted to communicate with the REST (REpresentational State Transfer)-full API (Application Programming Interface) in a Marvin framework, by providing a set of libraries for the HTTP (Hypertext Transfer Protocol) verbs used, which function without supplying the URL (Uniform Resource Locator) to the management server in which the REST API resides. Because of the discovery module 254, a user does not require knowledge of the location of the management server, in HA (High Availability) situations or environments, in which the management server can easily migrate, and the IP/URL (Internet Protocol/Uniform Resource Locator) frequently changes.

Figure 5:
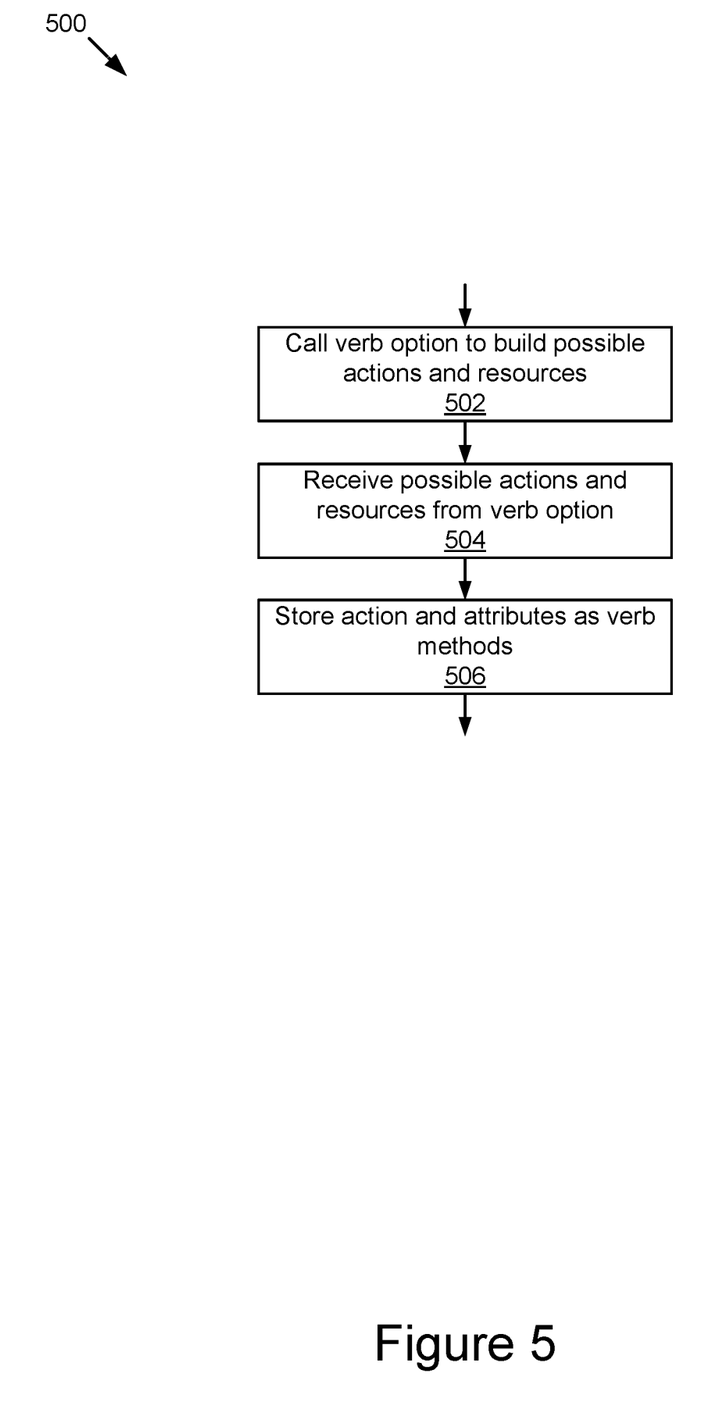
FIG. 5 is an example flow chart illustrating the operations involved in building and using HTTP options for interacting with resources.

Referring now to FIG. 5, a flow chart to describe example operations of the command-line module 252 is described. The process begins and is illustrated by reference numeral 500. The command-line module 252, by its option verb module 302, at step 502, may call a verb option to build possible actions and resources. The process 500 proceeds to step 504, at which point the attribute model 304 receives the possible actions and resources from the verb option. From there, the process proceeds to the next step 506, including one or more operations for storing the action and attributes as verb methods.

Figure 6:
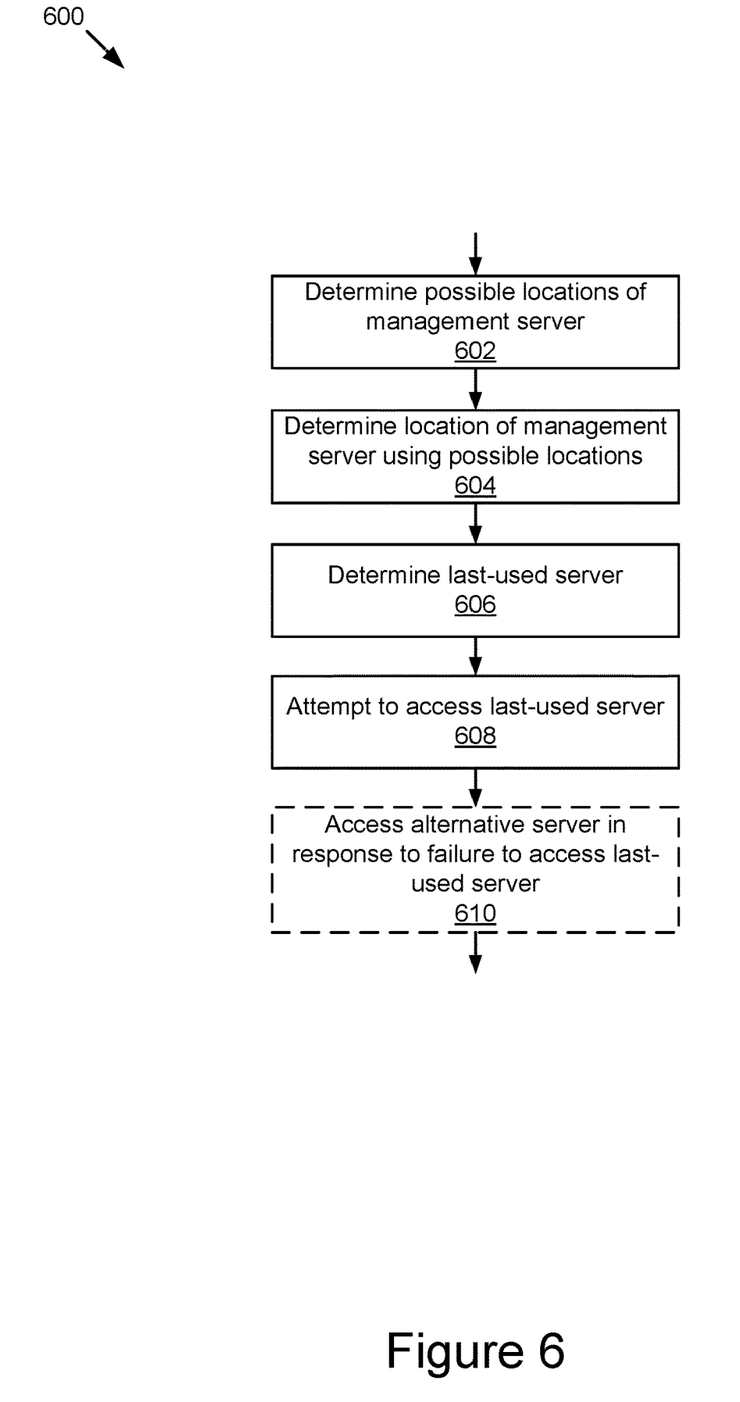
FIG. 6 is a flow chart illustrating an example method for automatic discovery of management nodes.

Referring now to FIG. 6, a flow chart to describe the example operations of the discovery module 254 is described. The process illustrated by reference numeral 600 begins and proceeds to step 602, at which the discovery module 254, by its management server discovery module 402, determines possible locations of the management server. The process 600 proceeds to the next step 604, at which the management server discovery module 402 determines the location of the management server using possible locations. The process 600 proceeds to the next step 606, at which discovery module 254 determines the last-used server. The process 600 proceeds to the next step 608, at which the discovery module 254, by its access-server module 404, attempts to access the last-used server. The process 600 follows to the next step 610, at which the discovery module 254 may access an alternative server in the event it fails to access the last-used server.

The Marvin framework is cognizant of which locations the management server may be located at, so the HTTP verb libraries supplied with Marvin's HA component enable a caller to omit the IP/URL, yet they can attempt to find the management server without that indication. As the management server itself may exercise HA over a number of machines and therefore, the REST API, this mechanism enables the caller to not concern itself with the HA concept and just leave out the IP/URL portion of the REST URL. The HA library, which the HTTP verb libraries are part of, observes which server it last used and attempts to try that server first to expedite operation and only if that attempt fails, does the server try the other possible locations. Also, the transport layer is automatically detected, eliminating the need for the caller to supply that. In some implementations, in practice, calling the Marvin HA HTTP POST function includes the following instruction:
ha.post ('/api/somefunction')
This instruction may be used instead of iterating the regular ha.post over all possible ips/urls. Nonetheless, even iterating the regular post is simply not as efficient because of the extent of caching by the HA library.

In operation, all REST locations on the API 214 (FIG. 2) feature an OPTIONS verb option, which the command-line module 252 calls to build up or create possible actions and resources (as illustrated in block 502 in FIG. 5). If the command-line module 252 calls the OPTIONS verb on REST API's root, it may return a number of resource actions, which the command-line module 252 then uses.

As none of the model's information is stored at all in the command-line module 252 to eliminate information duplication and possible discrepancies between the command-line module 252 and the model's information, it has enabled a lightweight, small, and stable structure. Actions and attributes that are obtained (as illustrated by block 504 in FIG. 5) through the OPTIONS web become an HA HTTP verb method implemented on the CLI's class, with resources serving as subclasses of the parent class. Input validation help functions and different levels of output control are in place. Therefore, these may be used, both by actual persons in a full featured CLI with human-readable-return messages as well as by other code requiring a call to an API function and expecting return codes, exception raising, etc. An example of a CLI command structure is illustrated below.
Example;
in [1]: from marvin.lib.cli import m
in [2]: m help( )
m: root object for the Marvin Framework
actions: (these items are callable and perform an action)
list ( ): lists all available resources
help( ): print this
resources: (these items are the main resources of the Marvin Framework)
environment
event
user
acl
group
rack
datacenter
network
machine
cluster
arakooncluster
mongocluster
task
for each of the resources specified by the OPTIONS on the root, the CLI will request the OPTIONS to dynamically build up or generate the entire CLI object to communicate with the API.
In [3]: m.machine.help( )
machine
actions: (these items are callable and perform an action)
get_ip_addresses ( )
get_location_string( )
get_task_targets( )
getconfig( )
attributes: (these items can be read or set and define the resource in some way)
status([,])
choices: NOTCONFIGURED CONFIGURING STOPPING STARTING
RESTARTING ONLINE OFFLINE DISABLED REBOOTING
SHUTDOWN DECOMMISSIONED
led([,])
description([,])
bootmode([,])
choices: DISK PXE hardwaretype([,])
actions([,])
role([,])
choices: CONTROLLER STORAGE SCALER COMBINED
raid ([,])
rack([,])
(*)name([,])
sub resources: (these items act as resources of a resource)
nic
application
disk
resource generic actions: (these items are always callable on all resources)
list( ): lists all resources' elements
help( ): prints this
Either the resource's guid or primary key can be used for an 'identifier.' (*) denotes the resource's primary attribute.
In [4]: m.machine.nic.help( )
machine.nic
actions: (these items are callable and perform an action)
add ( ): adds a sub resource to the resource
delete( ): deletes a sub resource to the resource
list( ): lists all sub resources in a resource
help( ): prints this
resources: (these items are the main resources of the Marvin Framework)
environment
event
user
acl
group
rack
datacenter
network
machine
cluster
arakooncluster
mongocluster
task
For each of the resources specified by the OPTIONS on the root, the CLI requests the OPTIONS to dynamically build up the entire CLI object to communicate with the API.
In [3]: m.machine.help( )
machine
actions: (these items are callable and perform an action)
get_ip_addresses( )
get_location_string( )
get_task_targets( )
getconfig( )
attributes: (these items can be read or set and define the resources in some way)
status ([,])
choices: NOTCONFIGURED CONFIGURING STOPPING STARTING
RESTARTING ONLINE OFFLINE DISABLED REBOOTING
SHUTDOWN DECOMMISSIONED
led([,])
description([,])
bootmode([,])
choices: DISK PXE
hardwaretype([,])
actions([,])
role([,])
choices: CONTROLLER STORAGE SCALER COMBINED
raid([,])
rack([.])
(*)name([,])
sub resources: (these items act as resources of a resource)
nic
application
disk
resource generic actions: (these items are always callable on all resources)
list( ): lists all the resources' elements
help( ): prints this
notes:
(*) denotes the resource's primary attribute.
In [4]: m.machine.nic.help( )
machine.nic
actions: (these items are callable and perform an action)
add( ): adds a sub resource to the resource
delete( ): deletes a sub resource to the resource
list( ): lists all sub resources in a resource
help( ): prints this
As all HTTP verb functions used by the command-line module 252 are Marvin's HA HTTP verbs, the CLI object is completely HA enabled. The management server may switch after the object is built, and the present system is adapted to function despite this instance, completely making the underlying HA system transparent for the calling library or user.

Figure 7:
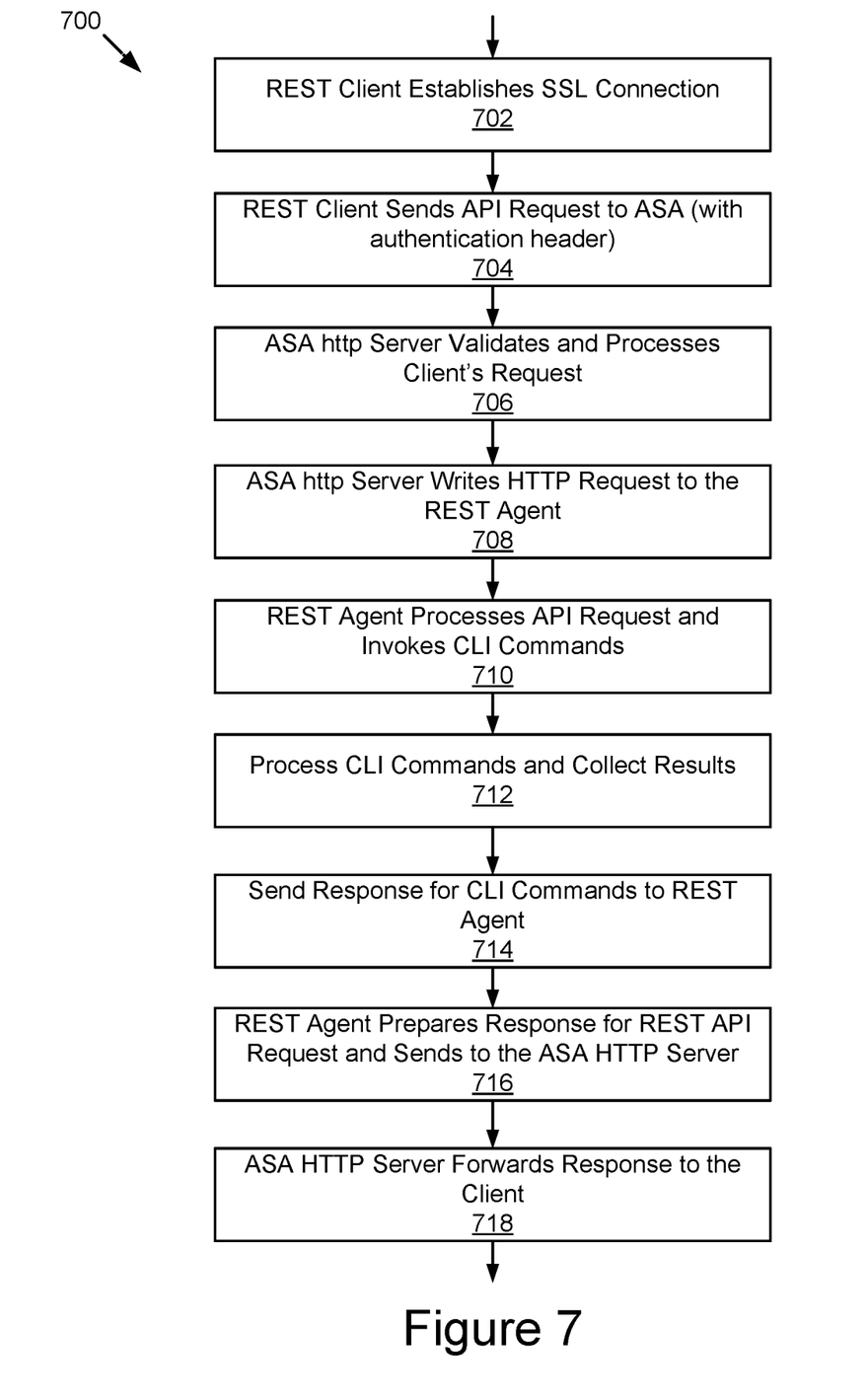
FIG. 7 is an example flow chart illustrating any REST PUT/POST/DELETE request by the API in FIG. 2 in the example environment illustrated in FIG. 1.

Referring now to FIG. 7, an example request flow for any REST PUT/POST/DELETE request by the API 214 (in FIG. 2) in the example environment of FIG. 1 is illustrated. The process 700 begins and proceeds to step 702, at which the REST client establishes a secure sockets layer (SSL) connection. The process proceeds to step 704, at which the REST client sends an API request to an ASA (security device combination of firewall, antivirus, intrusion prevention, and virtual private network capabilities) with an authentication header. The process 700 proceeds to the next step 706, at which the ASA http server validates and processes the client's request. The process 700 proceeds to the next step 708, at which the ASA http server writes HTTP request to the REST Agent. The process 700 proceeds to the next step 710, at which the REST Agent processes the API request and invokes CLI commands. The process 700 proceeds to the next step 712, at which CLI commands are processed and the results are collected. The process 700 proceeds to the next step 714, at which a response is sent for the CLI commands to the REST Agent. The process 700 proceeds to the next step 716, at which the REST Agent prepares the response for the REST API request and sends it to the ASA HTTP Server. The process 700 proceeds to the next step 718, at which step the ASA HTTP Server forwards the response to the client.

The systems and methods described above provide a highly reliable system for implementing cross device redundancy schemes. In the above description, for purposes of explanation, numerous specific details were set forth. It will be apparent, however, that the disclosed technologies can be practiced without any given subset of these specific details or in other environments appropriate for the present invention. In other instances, structures and devices are shown in block diagram form. For example, the disclosed technologies are described in some implementations above, with reference to user interfaces and particular hardware. Moreover, the technologies disclosed above are primarily in the context of online services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, state machines, gate arrays, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

When the disclosed technologies are embodied in the general context of computer-executable instructions, the embodiments may comprise program modules, executed by one or more systems, computers, or other devices. Generally, program modules include routines, programs, objects, components, data structures, and the like, that perform particular tasks or implement particular abstract data types. The functionality of the program modules may be combined or distributed as desired in various embodiments.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein to create special purpose apparatus, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein. The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system comprising:
a processor; and
memory storing instructions that, when executed, cause the processor to:
provide one or more Representational State Transfer (REST) locations on an application programming interface (API) for a particular application, wherein at least one REST API includes an OPTIONS verb option configured to respond to a call;
execute, responsive to a REST API root receiving the call for the OPTIONS verb option, the OPTIONS verb option to build a model with one or more possible actions and resources; and
respond to the call by returning the one or more possible actions and resources,
wherein:
the REST API root is configured to convert the one or more possible actions and resources to at least one verb method on a command-line interface (CLI) parent class; and
the CLI is configured to transport, between the REST API root and the particular application, human-readable messages and code configured to call an API function and receive return instructions using the at least one verb method to collect results for the one or more possible actions and resources.

2. The system of claim 1, wherein:
each action of the one or more possible actions and resources is configured to perform an action on a system; and
a resource of the one or more possible actions and resources is at least one of a plurality of main resources on a Marvin Framework.

3. The system of claim 1, wherein for each resource of the one or more possible actions and resources specified by the OPTIONS verb option, the CLI is configured to request the REST API to dynamically build a command-line object to communicate with the REST API.

4. The system of claim 1, further comprising:
a plurality of set attributes configured to define each resource of the one or more possible actions and resources.

5. The system of claim 1, further comprising:
one or more sub resources configured to act as resources of a resource in the one or more possible actions and resources.

6. The system of claim 1, wherein:
the CLI is enabled for a High-Availability (HA) environment; and
a high-availability system is transparent to a calling library or user.

7. The system of claim 6, wherein:
the calling library is from a set of libraries provided for the at least one verb method used; and
the at least one verb method functions without providing a Uniform Resource Locator (URL) to find and access a management server from a plurality of management servers in which the REST API resides.

8. A method, comprising:
providing one or more Representational State Transfer (REST) locations on an application programming interface (API) for a particular application, wherein at least one REST API includes an OPTIONS verb option configured to respond to a call;
executing, responsive to a REST API root receiving the call for the OPTIONS verb option, the OPTIONS verb option to build a model with one or more possible actions and resources; and
responding to the call by returning the one or more possible actions and resources for use,
wherein:
the REST API root is configured to convert the one or more possible actions and resources to at least one verb method on a command-line interface (CLI) parent class; and
the CLI is configured to transport, between the REST API root and the particular application, human-readable messages and code configured to call an API function and receive return instructions using the at least one verb method to collect results for the one or more possible actions and resources.

9. The method of claim 8, wherein:
each action of the one or more possible actions and resources is configured to perform an action on a system; and
a resource of the one or more possible actions and resources is at least one of a plurality of main resources on a Marvin Framework.

10. The method of claim 8, wherein for each resource of the one or more possible actions and resources specified by the OPTIONS verb option, the CLI is configured to request the REST API to dynamically build a command-line object to communicate with the REST API.

11. The method of claim 8, further comprising:
defining each resource of the one or more possible actions and resources with a plurality of attributes that are set.

12. The method of claim 8, further comprising:
configuring one or more sub resources to act as resources of a resource in the one or more possible actions and resources.

13. The method of claim 8, wherein resource generic actions are set to be callable on the resources in the one or more possible actions and resources.

14. The method of claim 8, wherein at least one of a resource Globally Unique Identifier (GUID) and a primary key are used for an identifier.

15. The method of claim 8, wherein:
the CLI is enabled for a High-Availability (HA) environment; and
a high-availability system is transparent to a calling library or user.

16. The method of claim 15, wherein:
the calling library is from a set of libraries provided for the at least one verb method used; and
the at least one verb method functions without providing a Uniform Resource Locator (URL) to find and access a management server from a plurality of management servers in which the REST API resides.

17. A system comprising:
means for providing one or more Representational State Transfer (REST) locations on an application programming interface (API) for a particular application, wherein at least one REST API includes an OPTIONS verb option configured to respond to a call;

means for executing, responsive to a REST API root receiving the call for the OPTIONS verb option, the OPTIONS verb option to build a model with one or more possible actions and resources; and means for responding to the call by returning the one or more possible actions and resources for use, wherein:

the REST API root is configured to convert the one or more possible actions and resources to at least one verb method on a command-line interface (CLI) parent class; and the CLI is configured to transport, between the REST API root and the particular application, human-readable messages and code configured to call an API function and receive return instructions using the at least one verb method to collect results for the one or more possible actions and resources.

18. The system of claim 17, wherein:

each action of the one or more possible actions and resources is configured to perform an action on a system; and a resource of the one or more possible actions and resources is at least one of a plurality of main resources on a Marvin Framework.

19. The system of claim 17, further comprising:

means for setting a plurality of attributes to define each resource of the one or more possible actions and resources.

20. The system of claim 17, further comprising:

means for configuring, for each resource of the one or more possible actions and resources specified by the OPTIONS verb option, the command-line interface to request the REST API to dynamically build a command-line object to communicate with the REST API.

21. The system of claim 17, further comprising:

means for configuring one or more sub resources to act as resources of a resource in the one or more possible actions and resources.

22. The system of claim 17, further comprising:

means for enabling the command-line interface for a high-availability environment, wherein a high-availability system is transparent to a calling library or user.

23. The system of claim 22, further comprising:

means for providing the calling library from a set of libraries provided for the at least one verb method used, wherein the at least one verb method functions without providing a Uniform Resource Locator (URL) to find and access a management server from a plurality of management servers in which the REST API resides.

* * * * *